United States Patent
Ye et al.

(10) Patent No.: US 9,217,877 B2
(45) Date of Patent: Dec. 22, 2015

(54) STEREOSCOPIC IMAGE DISPLAY APPARATUS HAVING FILM-TYPE PATTERNED RETARDER

(75) Inventors: Chengliang Ye, Shenzhen (CN); Hung-Lung Hou, Shenzhen (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 261 days.

(21) Appl. No.: 13/700,770

(22) PCT Filed: Jul. 5, 2012

(86) PCT No.: PCT/CN2012/078204
§ 371 (c)(1),
(2), (4) Date: Nov. 29, 2012

(87) PCT Pub. No.: WO2013/185394
PCT Pub. Date: Dec. 19, 2013

(65) Prior Publication Data
US 2013/0335462 A1  Dec. 19, 2013

(51) Int. Cl.
*G09G 5/02* (2006.01)
*G02B 27/26* (2006.01)
(Continued)

(52) U.S. Cl.
CPC ............ *G02B 27/26* (2013.01); *H04N 13/0422* (2013.01); *H04N 13/0434* (2013.01); *G02B 27/2214* (2013.01)

(58) Field of Classification Search
CPC ................ G09G 3/003; G09G 3/3648; G09G 2300/0426; G09G 3/3426; G09G 3/3611; G09G 2310/0224; G09G 2320/0242; G02B 27/26; G02F 1/1362; G02F 1/136286; G02F 2001/133638
USPC .................. 349/15, 37, 143; 345/6, 419, 697; 359/462, 464–466
See application file for complete search history.

(56) References Cited

U.S. PATENT DOCUMENTS

2007/0206011 A1  9/2007  Han et al.
2008/0198283 A1*  8/2008  Yoon et al. ...................... 349/37
(Continued)

FOREIGN PATENT DOCUMENTS

| CN | 101055393 A | 10/2007 |
| CN | 101251692 A | 8/2008 |
| CN | 101510395 A | 8/2009 |

(Continued)

*Primary Examiner* — Amare Mengistu
*Assistant Examiner* — Gloryvid Figueroa-Gibson

(57) ABSTRACT

A stereoscopic image display apparatus having patterned retarder is described. The stereoscopic image display apparatus having patterned retarder includes an array substrate, a polarized plate and a film-type patterned retarder (FPR). The array substrate includes a gate driver, a source driver, a plurality of pixel units and a plurality of transistor control modules. Each pixel unit corresponds to first scan line, second scan line and third scan line respectively. Each of the pixel units includes at least two data lines wherein the first scan line, the second scan line and the third scan line are insulatedly interlaced with the at least two data lines. A polarized plate receives a light beam passing through the array substrate to generate a linear polarized light beam. A film-type patterned retarder disposed on the polarized plate receives the light beam passing through the array substrate for generating the three-dimensional image on the polarized glasses.

6 Claims, 4 Drawing Sheets

(51) Int. Cl.
*H04N 13/04* (2006.01)
*G02B 27/22* (2006.01)

(56) References Cited

U.S. PATENT DOCUMENTS

2010/0265230 A1\* 10/2010 Kang .......................... 345/211

2011/0227886 A1 9/2011 Lee et al.

FOREIGN PATENT DOCUMENTS

| CN | 102193260 A | 9/2011 |
| CN | 202075968 U | 12/2011 |

\* cited by examiner

STEREOSCOPIC IMAGE DISPLAY APPARATUS HAVING FILM-TYPE PATTERNED RETARDER

FIELD OF THE INVENTION

The present invention relates to an image display apparatus, and more particularly to a stereoscopic image display apparatus having a film-type patterned retarder (FPR) to solve the problem of color washout occurred in a large visual field angle.

BACKGROUND OF THE INVENTION

The three-dimensional image display applies stereoscopic or autostereoscopic technique to display three-dimensional images. The stereoscopic technique implements the three-dimensional effect by the image parallax of the viewer's right and left eyes. The stereoscopic technique includes the methods with the polarized glasses and without the polarized glasses, which are widely applied. In the manner of taking polarized glasses, the image parallax of the viewer's right and left eyes can be displayed on the display apparatus based on direct sense of sight by changing the polarization direction of the image parallax of the viewer's right and left eyes. For example, a film-type patterned retarder (FPR) is applied to liquid crystal display (LCD) so that the viewer is capable of viewing the three-dimensional image using the polarized glasses. In the manner without polarized glasses, an optical plate with the separated image parallax of the viewer's right and left eyes in an optical axis is installed before or after the display apparatus for generating three-dimensional image.

Conventionally, the performance of the stereoscopic technique in the market aims to the development of rapid response time and wide viewing angle including the techniques of both multi-domain vertical alignment (MVA) and multi-domain horizontal alignment (MHA). Although the requirement of wide viewing angle in the stereoscopic image display apparatus is achieved by the techniques of MVA and MHA, however, the issue of color washout is widely reviled. Color washout means that the color tones of the displaying images is deviated when the viewers see the displaying images on the image display apparatus in different visual orientations. For example, as shown in FIG. 1, when the backlight 100 illuminates on the pixel units, i.e. PR, PG and PB, of the display panel 102 of the stereoscopic image display apparatus manufactured by tri-gate technique, the left-side eye image 106L and the right-side eye image are formed. When the viewer 104 looks on the pixel units PR, PG and PB in a top view to form the left-hand eye image 106L, the left-hand eye image 106L having blue color in pixel unit PB is seen at the area PA. When the viewer 104 looks on the pixel units PR, PG and PB in a bottom view to form the right-hand eye image 106R, the right-hand eye image 106R having blue color in pixel unit PR is seen at the area PB. Such these situations result in color washout of the display apparatus.

Consequently, there is a need to develop an image display apparatus to solve the problem of color washout occurred in a large visual field angle of the display apparatus.

SUMMARY OF THE INVENTION

One objective of the present invention is to provide a stereoscopic image display apparatus having a film-type patterned retarder (FPR) by utilizing the sub-pixels with different colors to be vertically disposed along the arrangement direction of the scan lines to solve the problem of color washout occurred in a large visual field angle. Further, by increasing the amount of gate electrode and reducing the data lines, the amount and cost of the conventional expensive data integrated circuit is effectively reduced for decreasing the manufacturing cost.

According to the above objective, the present invention sets forth a stereoscopic image display apparatus having patterned retarder adapted to the polarized glasses for viewing a three-dimensional image of the stereoscopic image display apparatus by using the polarized glasses. The stereoscopic image display apparatus having patterned retarder includes an array substrate, a polarized plate and a film-type patterned retarder (FPR). The array substrate includes a gate driver, a source driver, a plurality of pixel units and a plurality of transistor control modules. Each of the pixel units comprises a first sub-pixel, a second sub-pixel and a third sub-pixel, and the first sub-pixel, the second sub-pixel and the third sub-pixel in one of the pixel units corresponding to a first scan line, a second scan line and a third scan line respectively, wherein the first scan line, the second scan line and the third scan line are coupled to the gate driver and each of the pixel units is coupled to at least two data lines which is coupled to the source driver, and the first scan line, the second scan line and the third scan line are insulatedly interlaced with the at least two data lines. One of the transistor control modules coupling the first scan line, the second scan line and the third scan line to the first sub-pixel, the second sub-pixel and the third sub-pixel.

A polarized plate receives a light beam passing through the array substrate to generate a linear polarized light beam. A film-type patterned retarder (FPR) is disposed on the polarized plate and receives the light beam passing through the array substrate, wherein the linear polarized light beam passes through the film-type patterned retarder to form a polarized light beam with a phase difference for generating the three-dimensional image on the polarized glasses.

In one embodiment, each of the transistor control modules in the one of the pixel units comprises: a first thin-film transistor having a first source electrode coupled to the first data line, a first gate electrode coupled to the first scan line, and a first drain electrode coupled to the first sub-pixel; a second thin-film transistor having a second source electrode coupled to the second data line, a second gate electrode coupled to the second scan line, and a second drain electrode coupled to the second sub-pixel; and a third thin-film transistor having a third source electrode coupled to the third data line, a third gate electrode coupled to the third scan line, and a third drain electrode coupled to the third sub-pixel.

In one embodiment, each of the transistor control modules in the one of the pixel units comprises: a first thin-film transistor having a first source electrode coupled to the first data line, a first gate electrode coupled to the first scan line, and a first drain electrode coupled to the first sub-pixel; a second thin-film transistor having a second source electrode coupled to the first data line, a second gate electrode coupled to the second scan line, and a second drain electrode coupled to the second sub-pixel; and a third thin-film transistor having a third source electrode coupled to the second data line, a third gate electrode coupled to the third scan line, and a third drain electrode coupled to the third sub-pixel.

In one embodiment, another pixel unit adjacent to the one of the pixel unit comprises a fourth sub-pixel, a fifth sub-pixel and a sixth sub-pixel corresponding to the third scan line, the second scan line and the first scan line respectively, and the another pixel unit is coupled to a third data line and a fourth data line which are coupled to the source driver.

In one embodiment, another transistor control module in the another pixel unit comprises: a fourth thin-film transistor having a fourth source electrode coupled to the third data line, a fourth gate electrode coupled to the third scan line, and a fourth drain electrode coupled to the fourth sub-pixel; a fifth thin-film transistor having a fifth source electrode coupled to the third data line, a fifth gate electrode coupled to the second scan line, and a fifth drain electrode coupled to the fifth sub-pixel; and a sixth thin-film transistor having a sixth source electrode coupled to the fourth data line, a sixth gate electrode coupled to the first scan line, and a sixth drain electrode coupled to the sixth sub-pixel.

In one embodiment, the first data line is disposed between the first sub-pixel and the second sub-pixel, the second data line is disposed between the second sub-pixel and the third sub-pixel, the third data line is disposed between the fourth sub-pixel and the fifth sub-pixel, and the fourth data line is disposed between the fifth sub-pixel and the sixth sub-pixel.

In one embodiment, a plurality of directions of the first sub-pixel, the second sub-pixel and the third sub-pixel are parallel to a direction of the second scan line and vertical to a direction of the at least two data lines.

In one embodiment, the first sub-pixel, the second sub-pixel and the third sub-pixel are three primary colors with red, green and blue colors.

In one embodiment, the source driver utilizes a data integrated circuit to transmit a data signal to one of the pixel units via the at least two data lines.

In one embodiment, the data integrated circuit comprises three channels corresponding to three data lines for transmitting the data signal to the first sub-pixel, the second sub-pixel and the third sub-pixel respectively.

In one embodiment, the data integrated circuit comprises two channels corresponding to two data lines, and wherein one of the data lines selectively transmits the data signal to either the first sub-pixel or the second sub-pixel and the other data line transmits the data signal to the third sub-pixel respectively.

In one embodiment, the second scan line is overlapped on the first sub-pixel, the second sub-pixel and the third sub-pixel respectively to form a first storage capacity, a second storage capacity and a third storage capacity.

The present invention provides a stereoscopic image display apparatus having a film-type patterned retarder (FPR) to solve the problem of color washout occurred in a large visual field angle.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
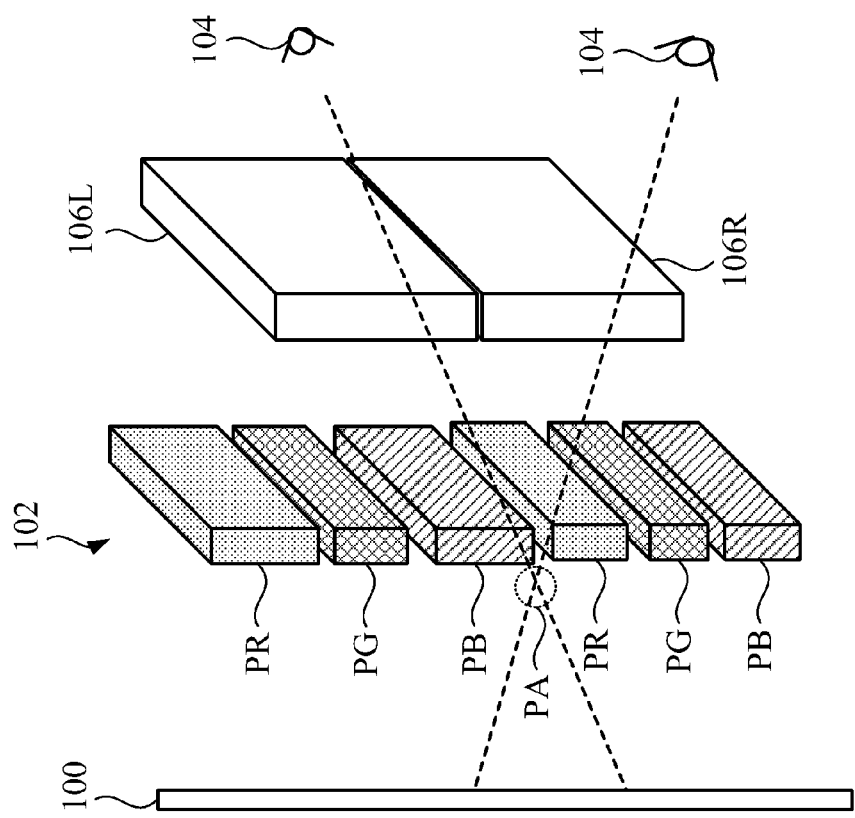
FIG. 1 is a schematic view of a conventional stereoscopic image display apparatus having a color washout.
Figure 2:
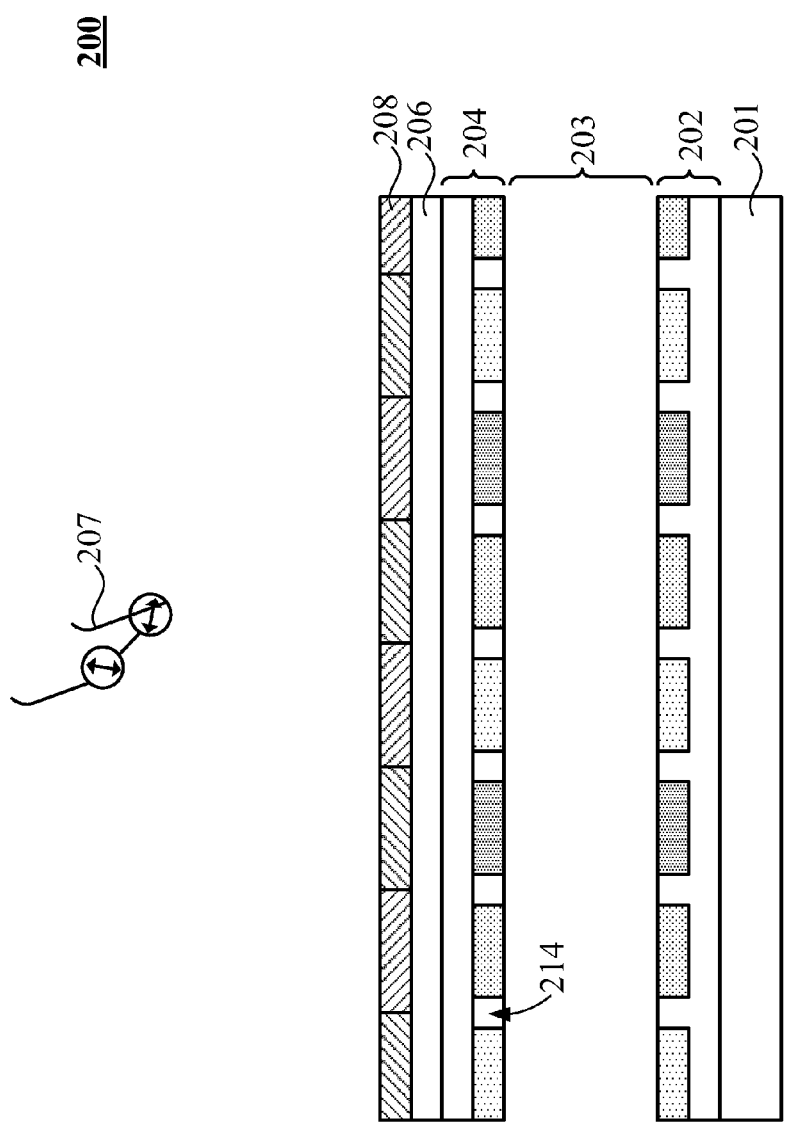
FIG. 2 is a schematic cross-sectional view of a stereoscopic image display apparatus having a film-type patterned retarder (FPR) according to one embodiment of the present invention.

Please refer to FIG. 2. FIG. 2 is a schematic cross-sectional view of a stereoscopic image display apparatus 200 having a film-type patterned retarder (FPR) according to one embodiment of the present invention. The stereoscopic image display apparatus 200 is adapted to the polarized glasses 207 for viewing a three-dimensional image generated by the stereoscopic image display apparatus 200 by using the polarized glasses 207. The stereoscopic image display apparatus 200 comprises a backlight module 201, an array substrate 202, a liquid crystal 203, a color filter 204, a polarized plate 206, and a film-type patterned retarder (FPR) 208. The color filter 204 is disposed in one side of the array substrate 202 wherein the color filter 204 includes a plurality of black matrix region 214 and the polarized plate 206 is disposed on the color filter 204. The film-type patterned retarder (FPR) 208 is disposed on the polarized plate 206.

When the stereoscopic image display apparatus 200 displays the three-dimensional image, the backlight module 201 illuminates the array substrate 202 and the color filter 204 receives the light from the array substrate 202. The polarized plate 206 receives the linear polarized light beam passing through the color filter 204. After the linear polarized light beam passes through the film-type patterned retarder 208, i.e. receiving the light beam from the array substrate 202, the film-type patterned retarder 208 forms a polarized light beam with a phase difference to generate the left-hand circularly polarized light and right-hand circularly polarized light. Finally, after the left-hand circularly polarized light and right-hand circularly polarized light pass through the polarized glasses, the circularly polarized light projects into the left and right eyes of the viewer's corresponding to the left-hand and right-hand images and thus viewer can see the three-dimensional image on the polarized glasses.

Figure 3:
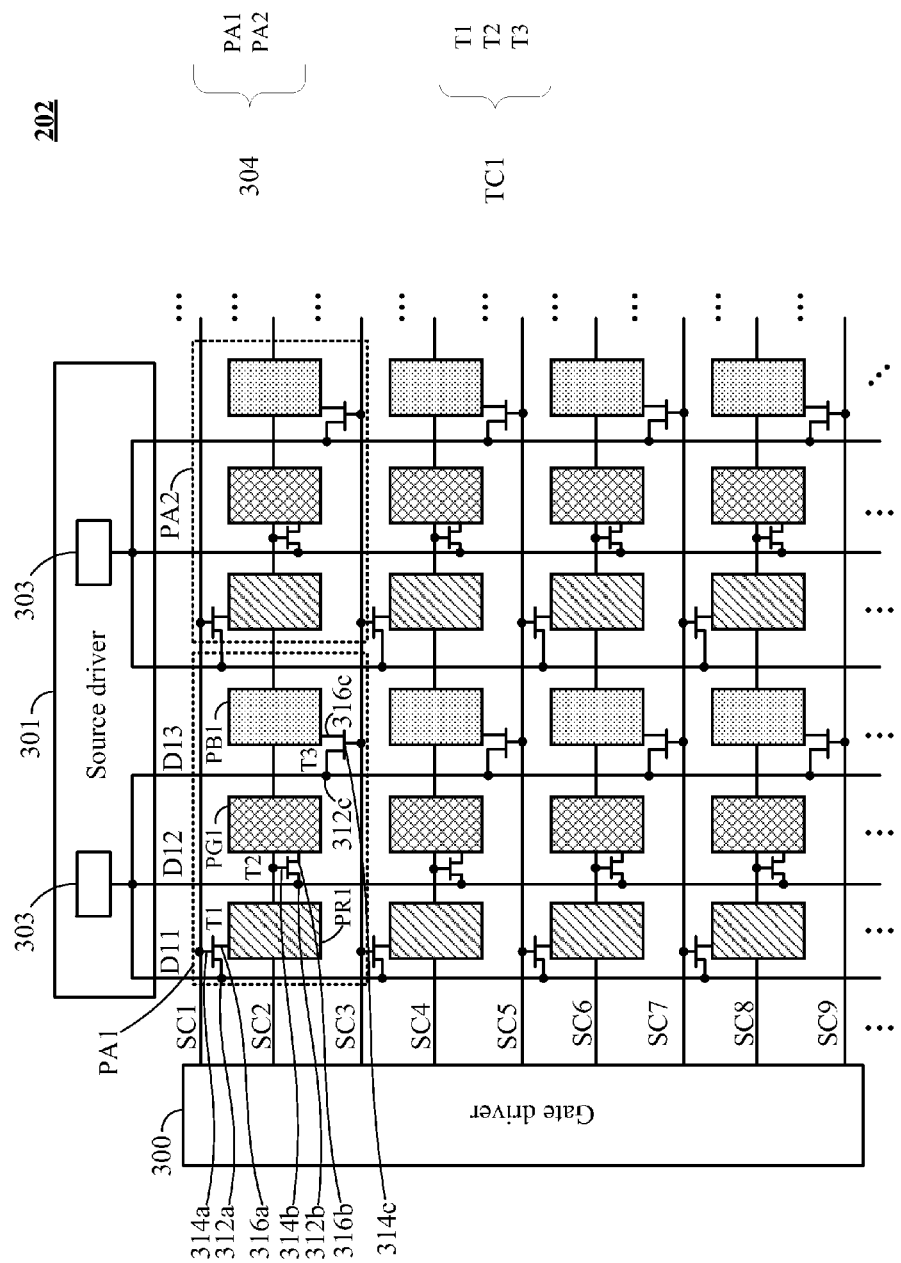
FIG. 3 is a schematic cross-sectional view of a driving circuit in an array substrate of the stereoscopic image display apparatus according to a first embodiment of the present invention.

Please see FIG. 3. FIG. 3 is a schematic cross-sectional view of a driving circuit in an array substrate 202 of the stereoscopic image display apparatus 200 according to a first embodiment of the present invention. The array substrate 202 includes a gate driver 300, a source driver 301, a plurality of pixel units 302 (including PA1 and PA2), and a plurality of transistor control modules 304 (including TC1 and TC2). Each of the pixel units 302 includes a first sub-pixel PR1, a second sub-pixel PG1 and a third sub-pixel PB1. The first sub-pixel PR1, the second sub-pixel PG1 and the third sub-pixel PB1 in the pixel unit PA1 correspond to a first scan line SC1, a second scan line SC2 and a third scan line SC3 respectively, wherein the first scan line SC1, the second scan line SC2 and the third scan line SC3 are coupled to the gate driver 300 and each of the pixel units 302 is coupled to at least two data lines, e.g. three data lines D11, D12 and D13, which is coupled to the source driver 301. The first scan line SC1, the second scan line SC2 and the third scan line SC3 are insulatedly interlaced with the three data lines D11, D12 and D13. The transistor control module TC1 couples with the first scan line SC1, the second scan line SC2 and the third scan line SC3 to the first sub-pixel PR1, the second sub-pixel PG1 and the third sub-pixel PB1 in the pixel unit PA1. The stereoscopic image display apparatus 200 of the present invention utilizes the sub-pixels PR1, PG1, and PB1 with different colors to be vertically disposed along the arrangement direction of the scan lines. When the view looks on the stereoscopic image display apparatus 200 along the vertical direction, i.e. the arrangement direction of the scan lines, the color tone of the pixel based on top view and bottom view along are the same to solve the problem of color washout.

As shown in FIG. 3, the transistor control module TC1 in the pixel unit PA1 includes a first thin-film transistor T1, a second thin-film transistor T2 and a third thin-film transistor T3. The first thin-film transistor T1 has a first source electrode 312a coupled to the first data line D11, a first gate electrode 314a coupled to the first scan line SC1, and a first drain electrode 316a coupled to the first sub-pixel PR1. The second thin-film transistor T2 has a second source electrode 312b coupled to the second data line D12, a second gate electrode 314b coupled to the second scan line SC2, and a second drain electrode 316b coupled to the second sub-pixel PG1. The third thin-film transistor T3 has a third source electrode 312c coupled to the third data line D13, a third gate electrode 314c coupled to the third scan line SC3, and a third drain electrode 316c coupled to the third sub-pixel PB1.

When the gate driver 300 turns on the first scan line SC1, the second scan line SC2 and the third scan line SC3, the source driver 301 transmits the data signal to the first thin-film transistor T1, the second thin-film transistor T2 and the third thin-film transistor T3 via the first data line D11, the second data line D12 and the third data line D13 for activating the first sub-pixel PR1, the second sub-pixel PG1 and the third sub-pixel PB1.

As shown in FIG. 3, the structure of the pixel unit PA1 is the same as that of another pixel unit PA2.

Figure 4:
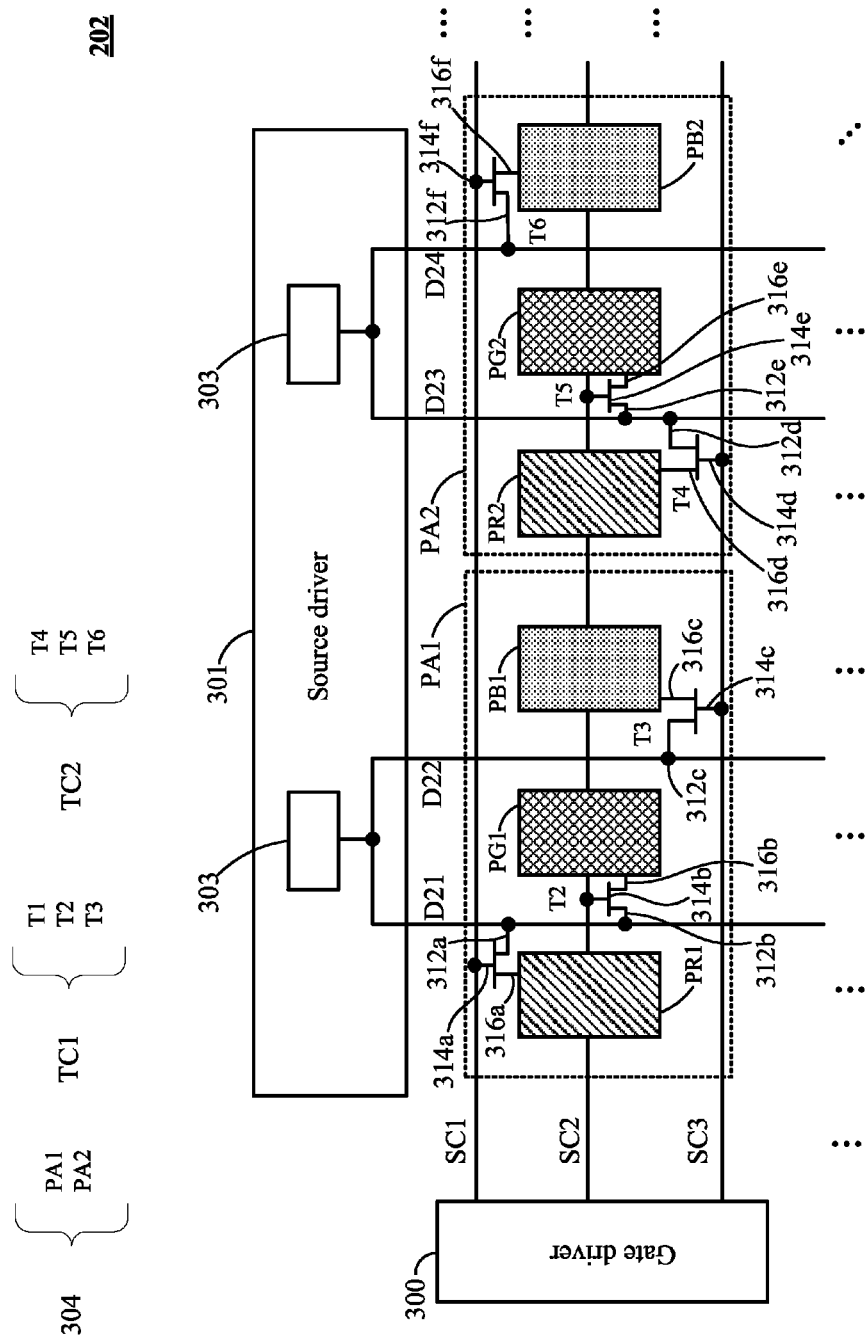
FIG. 4 is a schematic cross-sectional view of a driving circuit in an array substrate of the stereoscopic image display apparatus according to a second embodiment of the present invention.

Please refer to FIG. 4. FIG. 4 is a schematic cross-sectional view of a driving circuit in an array substrate 202 of the stereoscopic image display apparatus 200 according to a second embodiment of the present invention. Each of the pixel units 302 includes a first sub-pixel PR1, a second sub-pixel PG1 and a third sub-pixel PB1. The first sub-pixel PR1, the second sub-pixel PG1 and the third sub-pixel PB1 in the pixel unit PA1 correspond to a first scan line SC1, a second scan line SC2 and a third scan line SC3 respectively, wherein the first scan line SC1, the second scan line SC2 and the third scan line SC3 are coupled to the gate driver 300 and each of the pixel units 302 is coupled to at least two data lines, e.g. two data lines D21 and D22, which is coupled to the source driver 301. The first scan line SC1, the second scan line SC2 and the third scan line SC3 are insulatedly interlaced with the two data lines D21 and D22. The transistor control module TC1 couples with the first scan line SC1, the second scan line SC2 and the third scan line SC3 to the first sub-pixel PR1, the second sub-pixel PG1 and the third sub-pixel PB1 in the pixel unit PA1.

As shown in FIG. 4, the transistor control module TC1 in the pixel unit PA1 includes a first thin-film transistor T1, a second thin-film transistor T2 and a third thin-film transistor T3. The first thin-film transistor T1 has a first source electrode 312a coupled to the first data line D21, a first gate electrode 314a coupled to the first scan line SC1, and a first drain electrode 316a coupled to the first sub-pixel PR1. The second thin-film transistor T2 has a second source electrode 312b coupled to the first data line D21 (or the second data line D22), a second gate electrode 314b coupled to the second scan line SC2, and a second drain electrode 316b coupled to the second sub-pixel PG1. The third thin-film transistor T3 has a third source electrode 312c coupled to the second data line D22, a third gate electrode 314c coupled to the third scan line SC3, and a third drain electrode 316c coupled to the third sub-pixel PB1.

As shown in FIG. 4, another pixel unit PA2 adjacent to the pixel unit PA1 includes a fourth sub-pixel PR2, a fifth sub-pixel PG2 and a sixth sub-pixel PB2 corresponding to the third scan line SC3, the second scan line SC2 and the first scan line SC1 respectively. The another pixel unit PA2 is coupled to a third data line D23 and a fourth data line D24 which are coupled to the source driver 301.

Another transistor control module TC2 in the another pixel unit PA2 includes a fourth thin-film transistor T4, a fifth thin-film transistor T5 and a sixth thin-film transistor T6. The fourth thin-film transistor T4 has a fourth source electrode 312d coupled to the third data line D23, a fourth gate electrode 314d coupled to the third scan line SC3, and a fourth drain electrode 316d coupled to the fourth sub-pixel PR2. The fifth thin-film transistor T5 has a fifth source electrode 312e coupled to the third data line D23 (or the fourth data line D24), a fifth gate electrode 314e coupled to the second scan line SC2, and a fifth drain electrode 316e coupled to the fifth sub-pixel PG2. The sixth thin-film transistor T6 has a sixth source electrode 312f coupled to the fourth data line D24, a sixth gate electrode 314f coupled to the first scan line SC1, and a sixth drain electrode 316f coupled to the sixth sub-pixel PB2.

When the gate driver 300 turns on the first scan line SC1, the second scan line SC2 and the third scan line SC3 in the pixel unit PA1, the source driver 301 transmits the data signal to the first thin-film transistor T1, the second thin-film transistor T2 and the third thin-film transistor T3 via the first data line D21, the second data line D22 and the third data line D23 for activating the first sub-pixel PR1, the second sub-pixel PG1 and the third sub-pixel PB1. When the gate driver 300 turns on the first scan line SC1, the second scan line SC2 and the third scan line SC3 in the pixel unit PA2, the source driver 301 transmits the data signal to the sixth thin-film transistor T6, the fifth thin-film transistor T5 and the fourth thin-film transistor T4 via the fourth data line D24 and the third data line D23 for activating the sixth sub-pixel PB2, the fifth sub-pixel PG2 and the fourth sub-pixel PR2. Based on the above-mentioned driving method, the charging voltage applied to the third sub-pixel PB1 and the fourth sub-pixel PR2 to prevent the charging voltage from the voltage deviation and drop to uniform the color tone of the display image.

As shown in FIG. 4 according to one embodiment, the first data line D21 is disposed between the first sub-pixel PR1 and the second sub-pixel PG1. The second data line D22 is disposed between the second sub-pixel PG1 and the third sub-pixel PB1. The third data line D23 is disposed between the fourth sub-pixel PR2 and the fifth sub-pixel PG2. The fourth data line D24 is disposed between the fifth sub-pixel PG2 and the sixth sub-pixel PR2. In other words, by increasing the amount of gate electrode and reducing the data lines, the amount and cost of the conventional expensive data integrated circuit is effectively reduced for decreasing the manufacturing cost.

As shown in FIG. 3 and FIG. 4, a plurality of directions of the first sub-pixel PR1, the second sub-pixel PG1 and the third sub-pixel PB1 are parallel to a direction of the second scan line SC2 and vertical to a direction of the at least two data lines D11 and D12. In one embodiment, the first sub-pixel, the second sub-pixel and the third sub-pixel are three primary colors with red, green and blue colors.

As shown in FIG. 3 and FIG. 4, in the pixel unit PA1 or PA2 the source driver 301 utilizes a data integrated circuit 303 to transmit a data signal to one of the pixel units PA1 or PA2 via the at least two data lines D11 and D12 (or D21 and D22, or D23 and D24). As shown in FIG. 3, the data integrated circuit 303 includes three channels corresponding to three data lines for transmitting the data signal to the first sub-pixel PR1, the second sub-pixel PG1 and the third sub-pixel PB1 respectively. As shown in FIG. 4, the data integrated circuit 303 includes two channels corresponding to two data lines wherein one of the data lines selectively transmits the data signal to either the first sub-pixel PR1 and/or the second sub-pixel PG1 and the other data line transmits the data signal to the third sub-pixel PB1 respectively. While two data lines are employed, the aperture rate of the stereoscopic image display apparatus can be further increased.

As shown in FIG. 3, the second scan line SC2 is overlapped on the first sub-pixel PR1, the second sub-pixel PG1 and the third sub-pixel PB1 respectively to form a first storage capacity, a second storage capacity and a third storage capacity. As shown in FIG. 4, the second scan line SC2 is overlapped on the fourth sub-pixel PR2, the fifth sub-pixel PG2 and the sixth sub-pixel PB2 respectively to form a fourth storage capacity, a fifth storage capacity and a sixth storage capacity.

According to above-mentioned descriptions, the stereoscopic image display apparatus having a film-type patterned retarder (FPR) to solve the problem of color washout occurred in a large visual field angle and the amount and cost of the conventional expensive data integrated circuit is effectively reduced for decreasing the manufacturing cost.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A stereoscopic image display apparatus having a film-type patterned retarder adapted to polarized glasses for viewing a three-dimensional image of the stereoscopic image display apparatus by using the polarized glasses, the stereoscopic image display apparatus comprising:
    an array substrate, comprising:
        a gate driver;
        a source driver;
        a plurality of pixel units, each of the pixel units comprising a first sub-pixel, a second sub-pixel and a third sub-pixel, and the first sub-pixel, the second sub-pixel and the third sub-pixel in one of the pixel units corresponding to a first scan line, a second scan line and a third scan line respectively, wherein the first scan line, the second scan line and the third scan line are coupled to the gate driver and each of the pixel units is coupled to at least two data lines which are coupled to the source driver, and the first scan line, the second scan line and the third scan line are insulatedly interlaced with the at least two data lines, the at least two data lines comprise a first data line and a second data line; and
        a plurality of transistor control modules, one of the transistor control modules coupling the first scan line, the second scan line and the third scan line to the first sub-pixel, the second sub-pixel and the third sub-pixel;
    a polarized plate, for receiving a light beam passing through the array substrate to generate a linear polarized light beam; and
    the film-type patterned retarder (FPR) disposed on the polarized plate and receiving the light beam passing through the array substrate, wherein the linear polarized light beam passes through the film-type patterned retarder to form a polarized light beam with a phase difference for generating the three-dimensional image on the polarized glasses,
wherein each of the transistor control modules in the one of the pixel units comprises:
    a first thin-film transistor having a first source electrode coupled to the first data line, a first gate electrode coupled to the first scan line, and a first drain electrode coupled to the first sub-pixel;
    a second thin-film transistor having a second source electrode coupled to the first data line, a second gate electrode coupled to the second scan line, and a second drain electrode coupled to the second sub-pixel; and
    a third thin-film transistor having a third source electrode coupled to the second data line, a third gate electrode coupled to the third scan line, and a third drain electrode coupled to the third sub-pixel,
wherein another pixel unit adjacent to the one of the pixel units comprises a fourth sub-pixel, a fifth sub-pixel, and a sixth sub-pixel corresponding to the third scan line, the second scan line, and the first scan line respectively, and the another pixel units is coupled to a third data line and a fourth data line which are coupled to the source driver, wherein another transistor control module in the another pixel unit comprises:
    a fourth thin-film transistor having a fourth source electrode coupled to the third data line, a fourth gate electrode coupled to the third scan line, and a fourth drain electrode coupled to the fourth sub-pixel;
    a fifth thin-film transistor having a fifth source electrode coupled to the third data line, a fifth gate electrode coupled to the second scan line, and a fifth drain electrode coupled to the fifth sub-pixel; and
    a sixth thin-film transistor having a sixth source electrode coupled to the fourth data line, a sixth gate electrode coupled to the first scan line, and a sixth drain electrode coupled to the sixth sub-pixel.

2. The stereoscopic image display apparatus having the film-type patterned retarder of claim 1, wherein the first data line is disposed between the first sub-pixel and the second sub-pixel, the second data line is disposed between the second sub-pixel and the third sub-pixel, the third data line is disposed between the fourth sub-pixel and the fifth sub-pixel, and the fourth data line is disposed between the fifth sub-pixel and the sixth sub-pixel.

3. The stereoscopic image display apparatus having the film-type patterned retarder of claim 1, wherein an orientation of the first sub-pixel, the second sub-pixel and the third sub-pixel is parallel to a direction of the second scan line and is vertical to a direction of the at least two data lines.

4. The stereoscopic image display apparatus having the film-type patterned retarder of claim 3, wherein the first sub-pixel, the second sub-pixel and the third sub-pixel are three primary colors with red, green and blue colors.

5. The stereoscopic image display apparatus having the film-type patterned retarder of claim 1, wherein the source driver utilizes a data integrated circuit to transmit a data signal to one of the pixel units via the at least two data lines.

6. The stereoscopic image display apparatus having the film-type patterned retarder of claim 5, wherein the data integrated circuit comprises two channels corresponding to two data lines, and wherein one of the data lines selectively transmits the data signal to either the first sub-pixel or the second sub-pixel and the other data line transmits the data signal to the third sub-pixel respectively.

* * * * *

UNITED STATES PATENT AND TRADEMARK OFFICE
CERTIFICATE OF CORRECTION

PATENT NO. : 9,217,877 B2
APPLICATION NO. : 13/700770
DATED : December 22, 2015
INVENTOR(S) : Chengliang Ye and Hung-Lung Hou It is certified that error appears in the above-identified patent and that said Letters Patent is hereby corrected as shown below:

Title Page
Please add (30) foreign application data as claimed by Applicant: --June 14, 2012 (CN) 201210196531.3--.

Signed and Sealed this
Twenty-third Day of August, 2016

Michelle K. Lee
*Director of the United States Patent and Trademark Office*